(12) United States Patent
Brzeski et al.

(10) Patent No.: US 9,935,793 B2
(45) Date of Patent: Apr. 3, 2018

(54) GENERATING A LIVE CHAT SESSION IN RESPONSE TO SELECTION OF A CONTEXTUAL SHORTCUT

(75) Inventors: Vadim Von Brzeski, San Jose, CA (US); Reiner Kraft, Santa Clara, CA (US)

(73) Assignee: YAHOO HOLDINGS, INC., Sunnyvale, CA (US)

( * ) Notice: Subject to any disclaimer, the term of this patent is extended or adjusted under 35 U.S.C. 154(b) by 586 days.

(21) Appl. No.: 12/368,937

(22) Filed: Feb. 10, 2009

(65) Prior Publication Data

US 2010/0205544 A1 Aug. 12, 2010

(51) Int. Cl.
*G06F 3/00* (2006.01)
*H04L 12/66* (2006.01)

(52) U.S. Cl.
CPC .................. *H04L 12/66* (2013.01)

(58) Field of Classification Search
CPC .. H04L 12/581–12/5895; G06F 3/0482; G06F 3/0481
USPC ........ 715/204–208, 751, 758–760, 790, 808, 715/811, 822; 705/14.4, 14.66, 14.67; 707/777–778, 999.005
See application file for complete search history.

(56) References Cited

U.S. PATENT DOCUMENTS

| | | | |
|---|---|---|---|
| 5,537,618 A | | 7/1996 | Boulton et al. |
| 5,835,087 A | * | 11/1998 | Herz et al. ................ 715/810 |
| 5,872,924 A | | 2/1999 | Nakayama et al. |
| 6,574,792 B1 | | 6/2003 | Easton et al. |
| 6,704,729 B1 | * | 3/2004 | Klein et al. |
| 6,865,713 B1 | | 3/2005 | Bates et al. |
| 6,868,525 B1 | * | 3/2005 | Szabo ........................ 715/738 |
| 6,950,982 B1 | | 9/2005 | Dourish |
| 7,130,885 B2 | | 10/2006 | Chandra et al. |
| 7,143,089 B2 | | 11/2006 | Petras et al. |

(Continued)

FOREIGN PATENT DOCUMENTS

| | | |
|---|---|---|
| JP | 2007/334503 | 12/2007 |
| JP | 2008/117374 | 5/2008 |

(Continued)

OTHER PUBLICATIONS

OpenService Accelerators, Sep. 26, 2008, Microsoft, MSDN Library, retrieved via Internet Archive at http://replay.web.archive.org/20080926023738/http://msdn.microsoft.com/en-us/library/cc289775(VS.85).aspx.*

(Continued)

*Primary Examiner* — Haoshian Shih
(74) *Attorney, Agent, or Firm* — Pillsbury Winthrop Shaw Pittman LLP (57) ABSTRACT

Embodiments are directed to identifying entities in content, highlighting the identified entities, and displaying an interactive chat session based on a selected entity. The interactive chat session and the content may be displayed in the same browser window. The interactive chat session may be overlaid on top of the content, inserted inline into the content, or otherwise embedded within the content. The content and the interactive chat session may both remain active in the browser window, enabling a user to conveniently read and chat about the content. The topic of the interactive chat session may be automatically selected from a hierarchical taxonomy of chat session topics, or the user may select the topic from one or more provided taxonomies.

20 Claims, 6 Drawing Sheets

(56) References Cited

U.S. PATENT DOCUMENTS

| | | |
|---|---|---|
| 7,243,092 B2 * | 7/2007 | Woehler et al. |
| 7,263,526 B1 * | 8/2007 | Busey et al. |
| 7,328,031 B2 * | 2/2008 | Kraft ............................ 455/466 |
| 7,346,606 B2 * | 3/2008 | Bharat |
| 7,346,849 B1 | 3/2008 | Mulligan et al. |
| 7,356,772 B2 * | 4/2008 | Brownholtz et al. ......... 715/752 |
| 7,356,803 B2 | 4/2008 | Bau, III et al. |
| 7,370,285 B1 | 5/2008 | Nickerson et al. |
| 7,373,318 B2 | 5/2008 | Kutsumi et al. |
| 7,379,704 B2 | 5/2008 | Parker et al. |
| 7,392,469 B1 | 6/2008 | Bailin |
| 7,409,362 B2 | 8/2008 | Calabria |
| 7,437,421 B2 | 10/2008 | Bhogal et al. |
| 7,451,142 B2 | 11/2008 | Arellanes et al. |
| 7,451,188 B2 | 11/2008 | Cheung et al. |
| 7,930,348 B2 * | 4/2011 | Kusuda .......................... 709/205 |
| 2002/0156909 A1 * | 10/2002 | Harrington ................... 709/231 |
| 2003/0088623 A1 * | 5/2003 | Kusuda ........................ 709/204 |
| 2004/0078432 A1 * | 4/2004 | Manber et al. ............... 709/205 |
| 2004/0172323 A1 | 9/2004 | Stamm |
| 2005/0005258 A1 | 1/2005 | Bhogal et al. |
| 2005/0010641 A1 * | 1/2005 | Staack .......................... 709/206 |
| 2005/0114781 A1 * | 5/2005 | Brownholtz et al. ......... 715/733 |
| 2006/0026233 A1 * | 2/2006 | Tenembaum et al. ........ 709/205 |
| 2006/0129917 A1 * | 6/2006 | Volk et al. .................... 715/513 |
| 2007/0094341 A1 * | 4/2007 | Bostick ............... G06Q 10/107 709/207 |
| 2007/0118802 A1 * | 5/2007 | Gerace et al. ................ 715/738 |
| 2007/0118803 A1 * | 5/2007 | Walker et al. ................ 715/744 |
| 2007/0255791 A1 * | 11/2007 | Bodlaender et al. ......... 709/206 |
| 2007/0300160 A1 * | 12/2007 | Ferrel et al. .................. 715/744 |
| 2007/0300165 A1 * | 12/2007 | Haveliwala ................... 715/758 |
| 2008/0098026 A1 * | 4/2008 | Kraft et al. ................... 707/102 |
| 2008/0115068 A1 * | 5/2008 | Smith ........................... 715/758 |
| 2008/0147501 A1 * | 6/2008 | Gilliam ......................... 705/14 |
| 2008/0209361 A1 | 8/2008 | Nickerson et al. |
| 2008/0250327 A1 | 10/2008 | Li et al. |
| 2008/0270406 A1 | 10/2008 | Flavin et al. |
| 2012/0011454 A1 * | 1/2012 | Droz et al. .................... 715/758 |

FOREIGN PATENT DOCUMENTS

| | | |
|---|---|---|
| JP | 2008/146585 | 6/2008 |
| WO | WO--2007/116204 A1 | 10/2007 |
| WO | WO--2007/135688 A2 | 11/2007 |
| WO | WO--2008/061290 A1 | 5/2008 |
| WO | WO2009070927 * | 6/2009 ............ H04L 12/58 |

OTHER PUBLICATIONS

Schonfeld, Erick, "Reframe it Retreads Web Annotation as a Browser Add-On", TechCrunch, Oct. 8, 2008, http://www.techcrunch.com/2008/10/08/reframe-it-retreads-web-annotation-as-a-browswer-add-on/, accessed Nov. 20, 2008 (2 pages).

Gonzalez, Nick, "Five Ways to Mark Up the Web", TechCrunch, Apr. 10, 2007, http://techcrunch.com/2007/04/10/5-ways-to-mark-up-the-web/, accessed Nov. 20, 2008 (2 pages).

Needleman, Rafe, "Take your favorite blogs for a walk with Stickis", Webware—CNET, Nov. 28, 2006, http://news.cnet.com/8301-17939_109-9665274-2.html?tak=blog, accessed Nov. 20, 2008 (2 pages).

Sherman, Chris, "Diigo Offers Social Annotation Tool", Search Engine Watch (SEW), Jul. 26, 2006, http://searchenginewatch.com/3622969, accessed Nov. 20, 2008 (1 page).

Kirkpatrick, Marshall, "Fleck Offers Zero Friction Web Annotation", TechCrunch, Nov. 16, 2006, http://www.techcrunch.com/2006/11/16/fleck-offers-zero-friction-web-annotation/, accessed Nov. 20, 2008 (2 pages).

Heck, Rachel M. et al., "A survey of Web Annotation Systems", Department of Mathematics and Computer Science Grinnell College, 1999, http://www.math.grin.edu/~rebelsky/Blazers/Annotations/Summer1999/Papers/survey_paper.html, accessed Nov. 20, 2008 (6 pages).

* cited by examiner

GENERATING A LIVE CHAT SESSION IN RESPONSE TO SELECTION OF A CONTEXTUAL SHORTCUT

TECHNICAL FIELD

Embodiments relate generally to messaging over a network, and more particularly, but not exclusively, to providing a chat session in response to a user selection of an identified entity.

BACKGROUND

Computer networks, such as the internet, provide users with a large amount of content about a variety of topics. Typically, this content is generated in a web server and displayed in a web browser application. While viewing the content, the user may like to retrieve more information about an entity identified in a piece of content. One method of providing this additional information is with a traditional hyperlink that navigates the user to a different piece of content. This traditional web content is often static, and navigating between multiple pages can be cumbersome and time consuming to the user.

Static information pertaining may become stale, and in some cases completely irrelevant. Also, static content may not be very engaging. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

Embodiments of the present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, aspects of the present invention may be embodied as methods or devices. Accordingly, the embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" or "in an example embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In this specification, the term "client" refers to a computing module's general role as a requester of data or services, and the term "server" refers to a computing module's role as a provider of data or services. In general, it is possible that a computing module can act as a client, requesting data or services in one transaction and act as a server, providing data or services in another transaction, thus changing its role from client to server or vice versa.

The term "entity" refers to a name, text, image, or other object contained within a piece of content available over a network that is specified as being associated with additional linked information about the entity. An entity may be identified by a content author. Alternatively or additionally, an entity may be identified by performing an automatic analysis of the piece of content.

The term "contextual shortcut" refers to a user selectable control associated with an entity that enables the user to select the associated entity. A contextual shortcut is displayed in the content as an augmentation or replacement of the associated entity, indicating to the user that the entity is selectable by selecting the contextual shortcut. When selected, a contextual shortcut causes information associated with the underlying entity to be displayed. Alternative or additionally, selection of a contextual shortcut may cause dynamic interactive functionality associated with the underlying entity to be displayed. A user may select a contextual shortcut by hovering a mouse cursor over the contextual shortcut, clicking on the contextual shortcut with a mouse, issuing a command with a keyboard, activating a context menu, or any other means of selection as known to those skilled in the art.

Briefly stated, various embodiments are directed towards identifying entities in content, highlighting the identified entities with a contextual shortcut, receiving an indication that a user selected a contextual shortcut, and displaying an interactive chat session based on the entity underlying the contextual shortcut. In one embodiment the contextual shortcut is automatically selected based on a hierarchy of topics associated with the entity. Such actions are directed towards enabling easier and faster access to dynamic, relevant, and engaging chat sessions.

Illustrative Operating Environment

Figure 1:
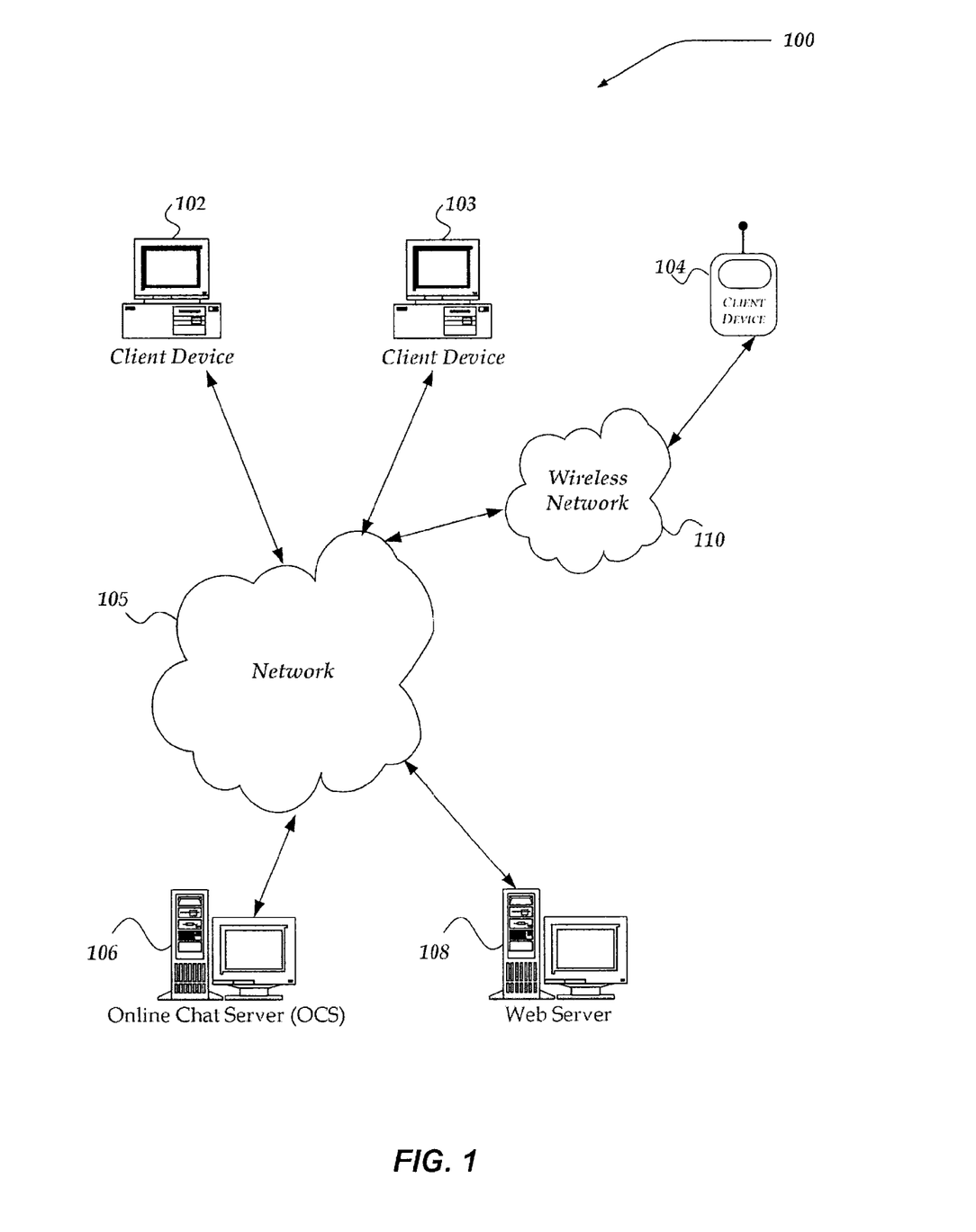
FIG. 1 shows a functional block diagram illustrating one embodiment of an environment for practicing aspects of the invention.

FIG. 1 illustrates one embodiment of an environment in which the invention may operate. However, not all of these components may be required to practice the invention, and variations in the arrangement and type of the components may be made without departing from the spirit or scope of the invention.

As shown in the figure, system 100 includes client devices 102-104, a network 105, a wireless network 110, online chat server (OCS) 106, and web server 108. Network 105 is in communication with and enables communication between each of client devices 102-103, wireless network 110, online chat service 106, and web server 108. Wireless network 110 is in communication with an enables communication between client device 104 and network 105.

Client devices 102-104 may include virtually any computing device capable of receiving and sending a message over a network, such as network 105, to and from another computing device, such as online chat server 106, web server 108, each other, and the like. The set of such devices generally includes devices that are usually considered general purpose devices and typically connect using a wired communications medium at one or more fixed location such as desktop computers, laptop computers, and the like. The set of such devices may also include mobile devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Client devices 102-104 may also be any device that is capable of connecting using a wired or wireless communication medium such as a personal digital assistant (PDA), POCKET PC, wearable computer, and any other device that is equipped to communicate over a wired and/or wireless communication medium.

Each client device within client devices 102-104 may include a user interface that enables a user to control settings, and to instruct the client device to perform operations. Each client device also includes a client user-agent that enables the client device to send and receive messages to/from another computing device employing the same or a different communication means, including, but not limited to Short Message Service (SMS), Multimedia Messaging Service (MMS), Instant Messenger (IM), Internet Relay Chat (IRC), Mardam-Bey's internet relay chat (mIRC), Jabber, email, interactive chat sessions, and the like.

Client devices 102-104 may be further configured with a browser application that is configured to receive and to send content in a variety of forms, including, but not limited to markup pages, web-based messages, audio files, graphical files, file downloads, applets, scripts, and the like. The browser application may be configured to receive and display graphics, text, multimedia, and the like, employing virtually any conventional markup based language or conventional web protocol, including, but not limited to Standard Generalized Markup Language (SGML), Hypertext Markup Language (HTML), Extensible Markup Language (XML), and the like. Mobile client devices may use a browser application configured to receive and display graphics, text, multimedia, and the like employing a mobile markup based language or Wireless Application Protocol (WAP), including, but not limited to a Handheld Device Markup Language (HDML), such as Wireless Markup Language (WML), WMLScript, JavaScript, EXtensible HTML (XHTML), or the like. The browser application is another example, of a user-agent.

Client devices 102-104 may be configured to enable contextual shortcuts based on identified entities to be selectable in the browser application by a user. In one embodiment a contextual shortcut may comprise a hyperlink, an image, a button, highlighted text, underlined text, text with a dotted underline, or any other indication to the user that the entity is selectable. Client devices 102-104 may also be configured to transmit an indication that at least one of the contextual shortcuts has been selected by a user. In one embodiment, the user may select a contextual shortcut by hovering a mouse over the contextual shortcut for a pre-determined amount of time. It is also considered that the user may select a contextual shortcut by clicking on the contextual shortcut and moving a mouse cursor over the contextual shortcut, among other selection mechanisms.

Client devices 102-104 may also display an interactive chat session (ICS). The ICS may be generated by or based on communication with OCS 106, the web server 108, or both. The ICS may be initiated by the web server 108 in response to the user selecting a contextual shortcut. The ICS may be based on a topic associated with the entity underlying the selected contextual shortcut. In one embodiment, the ICS may be displayed within the web browser application that is displaying the content that contains the selected contextual shortcut, while the content continues to be displayed. Selection of an ICS is described in more detail below in conjunction with FIGS. 4-5.

Network 105 is configured to couple one computing device to another computing device to enable them to communicate. Network 105 is enabled to employ any form of medium for communicating information from one electronic device to another. Also, network 105 may include a wireless interface, such as a cellular network interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize cellular telephone signals over air, analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between client devices 102-103, OCS 106, web server 108, and/or wireless network 110. Network 105 is constructed for use with various communication protocols including wireless application protocol (WAP), transmission control protocol/internet protocol (TCP/IP), code division multiple access (CDMA), global system for mobile communications (GSM), and the like.

Wireless network 110 is configured to couple one computing device to another computing device to enable them to communicate. Wireless network 110 is enabled to employ any form of wireless medium for communicating information from one electronic device to another. Wireless network 110 may include a cellular network interface, including satellite links, or other communications wireless links known to those skilled in the art. In essence, wireless network 110 includes any wireless communication method by which information may travel between client device 104 and network 105. Wireless network 110 is constructed for use with various communication protocols including wireless application protocol (WAP), transmission control protocol/internet protocol (TCP/IP), code division multiple access (CDMA), global system for mobile communications (GSM), and the like.

The media used to transmit information in communication links as described above generally includes any media that can be accessed by a computing device. Computer-readable media may include computer storage media, wired and wireless communication media, or any combination thereof. Additionally, computer-readable media typically embodies computer-readable instructions, data structures, program modules, or other transport mechanisms. By way of example, communication media includes wireless media such as acoustic, RF, infrared, and other wireless media, and wired media such as twisted pair, coaxial cable, fiber optics, wave guides, and other wired media.

Web server 108 includes virtually any network device that may be configured to provide content over a network. In one embodiment, web server 108 may provide access to content using a domain name. Moreover, such content may typically be configured for viewing using a variety of user-agents, including web browsers, or the like. Some of the content may be analyzed to identify entities within the content and contextual shortcuts embedded within the content based on the identified entities. In one embodiment, web server 108 may organize at least some of its content based on a host name.

Web server 108 may also operate a conventional web search server, a messaging server, a File Transfer Protocol (FTP) server, a database server, application server, and the like. Devices that may operate as web server 108 generally include personal computers, desktop computers, multiprocessor systems, microprocessor-based or programmable consumer electronics, network PCs, servers, and the like.

One embodiment of a network device operable as OCS 106 is described in more detail below in conjunction with FIG. 3. Briefly, however, 106 OCS 106 includes virtually any network device that may be configured to host interactive chat room sessions. OCS 106 may employ a database to store live chat sessions. Although OCS 106 is illustrated as a single network device, the invention is not so limited. For example, OCS 106 may be implemented using several network devices, without departing from the scope of the invention. Alternatively or additionally, OCS 106 may be integrated into web server 108. Devices that may operate as OCS 106 include personal computers, desktop computers, multiprocessor systems, microprocessor-based or programmable consumer electronics, network PCs, servers, and the like.

Illustrative Client Device

Figure 2:
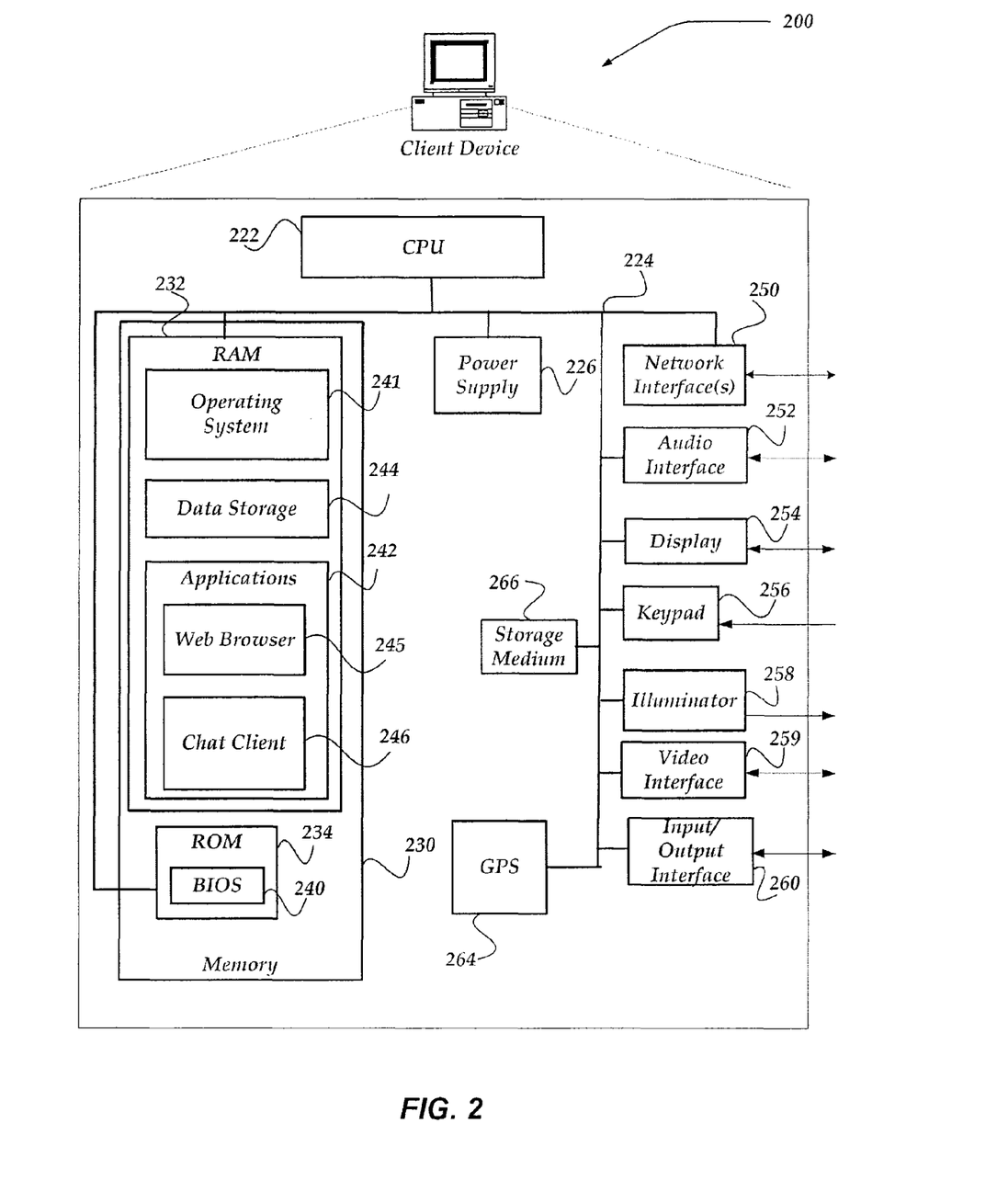
FIG. 2 shows one embodiment of a client device that may be included in a system implementing the various aspects of the invention.

FIG. 2 shows one embodiment of client device 200 that may be included in a system implementing the invention. Client device 200 may include many more or less components than those shown in FIG. 2. However, the components shown are sufficient to disclose an embodiment for practicing the present invention. Client device 200 may represent, for example, client devices 102-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252 that may be configured to receive an audio input as well as to provide an audio output, a display 254, a keypad 256, an illuminator 258, a video interface 259, an input/output interface 260, a global positioning systems (GPS) receiver 264, and storage medium 266.

Power supply 226 provides power to client device 200. A rechargeable or non-rechargeable battery may be used to provide power. The power may also be provided by an external power source, such as an AC adapter or a powered docking cradle that supplements and/or recharges a battery.

Network interface 250 includes circuitry for coupling client device 200 to one or more networks, and is constructed for use with one or more communication protocols and technologies including, but not limited to, Ethernet, USB, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth, Wi-Fi, Zigbee, UMTS, HSDPA, WCDMA, WEDGE, or any of a variety of other wired and/or wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action.

Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Input/output (I/O) interface 260 can utilize one or more communication technologies, such as USB, infrared, Bluetooth™, or the like. Client device 200 may use I/O interface 260 for communicating with external devices, such as a headset, or other input or output devices not shown in FIG. 2.

GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, mobile device may through other components, provide other information that may be employed to determine a physical location of the device, including for example, a Media Access Control (MAC) address, Internet Protocol (IP) address, or the like.

Mass memory 230 includes a RAM 232, a ROM 234, and other storage means. Mass memory 230 illustrates another example of computer readable storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as the Windows™ or OSX operating system. The operating system may include, or interface with a Java virtual machine module that enables control of hardware components and/or operating system operations via Java application programs.

Memory 230 further includes one or more data storage 244, which can be utilized by client device 200 to store, among other things, applications and/or other data. For example, data storage 244 may also be employed to store information that describes various capabilities of client device 200, a device identifier, and the like. The information may then be provided to another device based on any of a variety of events, including being sent as part of a header during a communication, sent upon request, or the like.

In one embodiment, data storage 244 may also include files for use with, and/or obtained from another network device. Data storage 244 may further include cookies, and/or user preferences including, but not limited to user interface options, address books, buddy lists, and the like. At least a portion of various information, files, and the like, may also be stored on storage medium 266 or other computer-readable storage medium within client device 200. Such computer-readable storage medium may include removable storage mediums, such as disks, tape, Universal Serial Bus (USB) storage devices, as well as hard-drives, and the like.

Applications 242 may include computer executable instructions which, when executed by client device 200, transmit, receive, and/or otherwise process messages (e.g., SMS, MMS, IMS, IM, email, and/or other messages), audio, video, and enable telecommunication with another user of another client device. Other examples of application programs include calendars, email clients, IM applications, Voice Over Internet Protocol (VOIP) applications, contact managers, task managers, database programs, word processing programs, security applications, spreadsheet programs, games, search programs, and so forth. Applications 242 may further include web browser 245, and chat client 246.

Chat client 246 may be configured to communicate with OCS 106 or alternatively web server 108 of FIG. 1 to obtain an ICS for display on client device 200. The chat client 246 may communicate with OCS 106 with SMS, MMS, IMS, IM, email, and/or other message transfer protocols. In one embodiment, chat client 246 may display a chat session associated with an entity in response to a user selection of a contextual shortcut associated with the entity, as further described below with reference to FIGS. 4-6.

Web browser 245 may include virtually any client application configured to receive and display graphic, text, multimedia, and the like, employing virtually any web based language. In one embodiment, the web browser application 245 is enabled to employ Standard Generalized Markup Language (SMGL), Hypertext Markup Language (HTML), eXtensible Markup Language (XML), Handheld Device Markup Language (HDML), Wireless Markup Language (WML), WMLScript, JavaScript, and the like, to display a piece of content. However, any of a variety of other web based languages may also be employed.

In one embodiment, using browser 245, a user may view content on a web page, the content having one or more contextual shortcuts. Each contextual shortcut may highlight an entity in the content. If the article or other content contains more than one instance of an entity, such as content containing the name of an actor multiple times, each instance of the entity may be associated with a different contextual shortcut. The user may select an entity and in response, be presented with a dynamic, interactive chat session associated with the selected entity. In one embodiment, the chat session is displayed in the same browser window as the article or other content from which the entity was selected. Alternatively or additionally, the topic of the chat session may be selected from a hierarchical taxonomy of topics associated with the selected entity.

Illustrative Network Device

Figure 3:
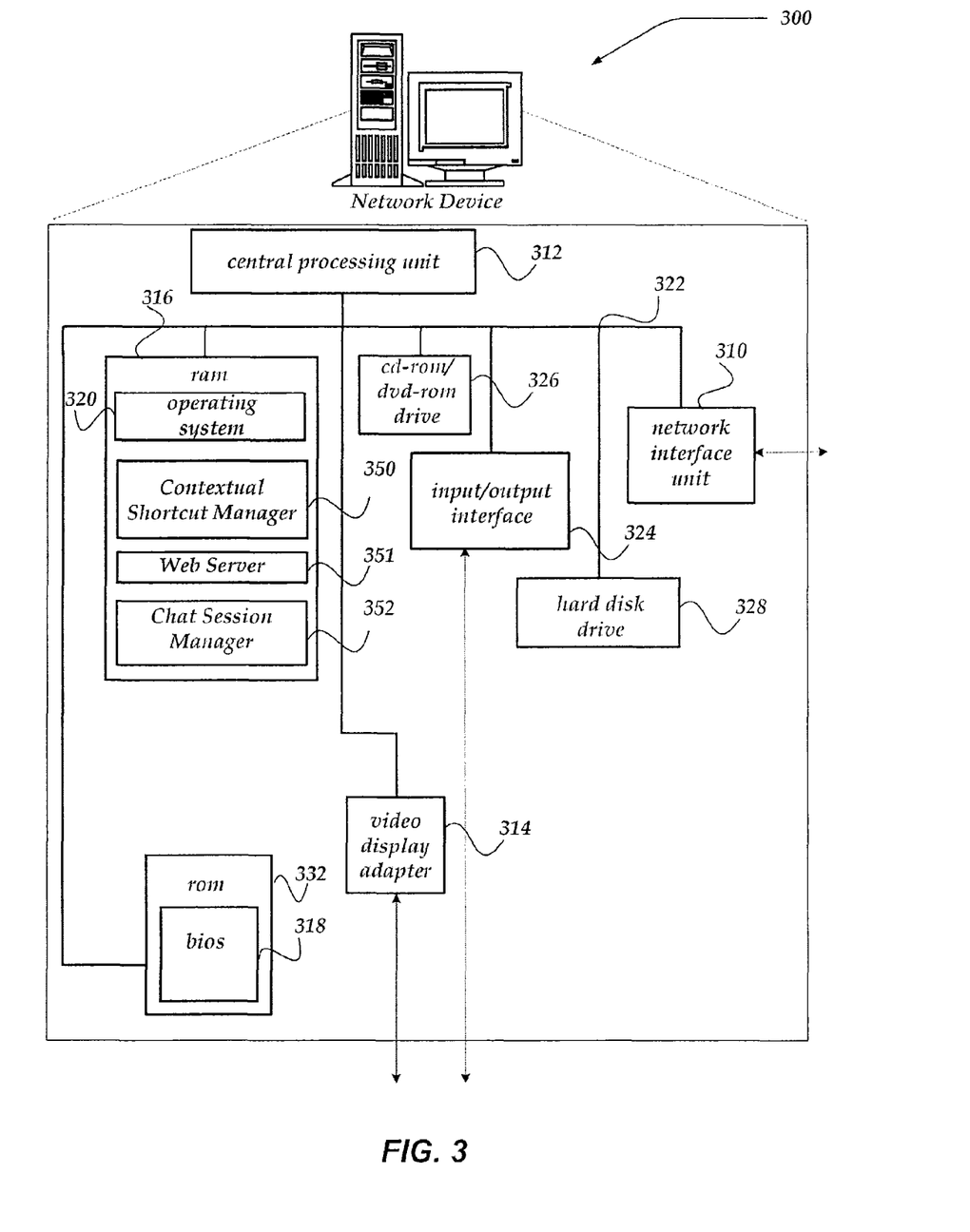
FIG. 3 shows one embodiment of a network device that may be included in a system implementing aspects of the invention.

FIG. 3 shows one embodiment of a network device, according to one embodiment of the invention. Network device 300 may include many more components than those shown. The components shown, however, are sufficient to disclose an embodiment for practicing the invention. Network device 300 may represent, for example, an embodiment for any of OCS 106 or web server 108 shown in FIG. 1.

Network device 300 may include central processing unit 312, video display adapter 314, and a mass memory, all in communication with each other via bus 322. The mass memory generally includes RAM 316, ROM 332, and one or more permanent mass storage devices, such as hard disk drive 328, and removable storage device 326 that may represent a tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol, Ethernet, USB, Wi-Fi, Zigbee, WCDMA, HSDPA, Bluetooth, WEDGE, EDGE, UMTS, or the like. Network interface unit 310 is sometimes known as a transceiver, transceiving device, or network interface card (NIC).

The mass memory as described above illustrates another type of computer-readable media, namely computer storage media. Computer readable storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account management and so forth. Applications may also include contextual shortcut manager 350, web server 351, and chat session manager 352.

Contextual shortcut manager 350 may analyze content to identify entities in the content, such as a person name, place name, celebrities, movie stars, musicians, politicians, sports figures, business figures, movie titles, cities, countries, landmarks, or any other individual, location, event, or other potential topic of conversation. The contextual shortcut manager 350 may infer entities through an analysis of a piece of content. Alternatively or additionally, the contextual shortcut manager 350 may receive content with entities already selected by a content author. The contextual shortcut manager 350 may then create a contextual shortcut based on an identified entity that when displayed by the web browser 245 highlights that the identified entity is selectable.

In one embodiment, selection of the contextual shortcut may cause a chat session to be displayed, the chat session having a topic associated with the entity the contextual shortcut is based on. Alternatively or additionally, the contextual shortcut manager 350 may remove a contextual shortcut or otherwise remove any highlighting of an entity when the contextual shortcut manager 350 determines no chat sessions having topics associated with the entity exist.

In one embodiment, web server 351 may receive user requests for content from a client, invoke the contextual shortcut manager 350 to generate contextual shortcuts in the content, and transmit the content with contextual shortcuts to the requesting client. In one embodiment, chat session manager 352 may comprise a server for managing interactive chat sessions between users.

Generalized Operation

Figure 4:
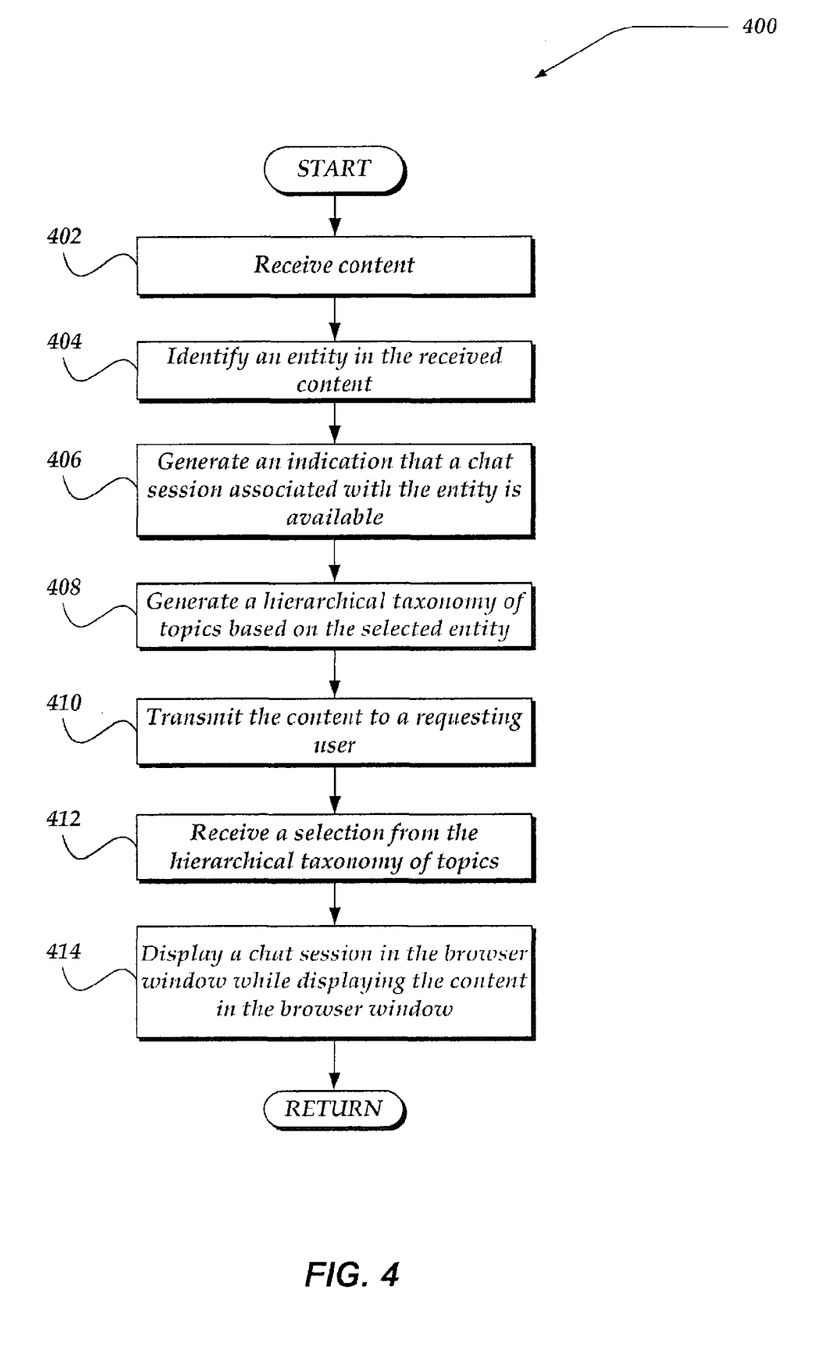
FIG. 4 illustrates a logical flow diagram generally showing one embodiment of a process for displaying a chat session associated with an identified entity.

The operation of certain aspects of the invention will now be described with respect to FIG. 4. FIG. 4 illustrates a logical flow diagram generally showing one embodiment of a process for displaying an interactive chat session in a browser window in response to a user selecting a contextual shortcut associated with an entity identified in the content. In one embodiment, the interactive chat session may be displayed in the same browser window as content. Process 400 of FIG. 4 may be implemented within web server 108 or OCS 106 of FIG. 1.

Process 400 begins, after a start block, at block 402 where content is received. In one embodiment, the content may be received from a content author, such as a third party content provider. The content may be contained in one or more text-based files and/or one or more image-based files. The content may be statically generated, dynamically generated, or a combination of statically and dynamically generated content. The content may be contained in virtually any conventional markup based language, including but not limited to, Standard Generalized Markup Language (SGML), Hypertext Markup Language (HTML), Extensible Markup Language (XML), EXtensible HTML (XHTML), and the like. Alternatively or additionally, the content may be contained in virtually any document type, including but not limited to, word processing documents, spreadsheet documents, Portable Document Format (PDF) documents, and the like.

Processing continues to block 404 where entities in the received content are identified. An entity as defined infra may be, for example, a person name or a place name that a user may would like more information about. In one embodiment, entities may be defined by the content author. When entities have been defined by the content author, the processing at block 404 may optionally identify additional entities that were not identified by the content author. In another embodiment, when the content author did not identify any entities in the received content, the processing of block 404 may identify entities based on any number of algorithms or processes. One illustrative algorithm that identifies entities comprises matching words contained in the received content with a list of known celebrities, a list of current events, or other keywords, key phrases, or the like. In one embodiment an entity may be based on a piece of text, such as a word or a group of words. Alternatively or additionally, an entity may be based on an image, a graphic, or any other object contained in the received content.

Process 400 continues to block 406, where contextual shortcuts are generated in the content based on the identified entities. In one embodiment, a contextual shortcut may indicate to the user that a chat session associated with the entity underlying the contextual shortcut may be available. In one embodiment, the presence of an entity having a contextual shortcut may be indicated with a special highlight (for example, font type, font size, underlining, different colors, and the like) on certain portions of the document. The certain portions of the document may include but are not limited to, words, phrases, or other objects, such as a picture/graphic. In one embodiment, a contextual shortcut may be removed from a transmitted content when the entity underlying the contextual shortcut no longer has available chat sessions.

Process 400 continues to block 408, where a hierarchical taxonomy of topics is generated based on the identified entity. In one embodiment the hierarchical taxonomy of topics is generated dynamically, in response to selection of the identified entity. Alternatively or additionally, the hierarchical taxonomy of topics may be generated before transmitting the content to client device 200. In one embodiment, the hierarchical taxonomy of topics enables users to enter an active chat session relevant to an entity selected by the user, even when no chat session having a topic specific to the selected entity is active or when no such chat session exists.

Process 400 continues to block 410, where the content may be transmitted as modified to a requesting client device. In one embodiment the requesting client device may display the content in an appropriate content display application, such as web browser 245. In one embodiment the content, such as an HTML web page, is displayed in one window, or tab at the client device. The user may be enabled to select a contextual shortcut by clicking on the contextual shortcut with a mouse, or "mousing over" a contextual shortcut with a mouse cursor.

Process 400 continues to block 412, where a selection from the hierarchical taxonomy of topics is received. In one embodiment, the received topic is automatically determined from the hierarchical taxonomy of topics based on proximity to the selected entity. Alternatively or additionally, a user is enabled to manually select the received topic from the hierarchical taxonomy of topics. The received topic may have an active chat session associated with it, an inactive chat session associated with it, or no chat session associated with it. When no active chat session is associated with the received topic, chat session manager 352 may enable the user to invite friends into the chat session. When no active chat session associated with the received topic exists, chat session manager 352 may initiate a chat session having the received topic. In another embodiment, no chat session might be allowed.

Process 400 continues to block 414, where the content display application, such as web browser 245, displays an interactive chat session generated by chat session manager 352 that is associated with the received topic. In one embodiment, the interactive chat session is displayed within the browser window that is displaying the transmitted content. By opening an interactive chat session in the browser window that is displaying the transmitted content while continuing to display the transmitted content, a user is enabled to experience the interactive chat session while maintaining a convenient view of the transmitted content.

Once a topic has been chosen, based on the selected entity, a chat session having the chosen topic may be displayed in the browser window while the display of the transmitted content is maintained. In another embodiment, the chat session may be displayed in a new browser window, a new browser tab, in a stand-alone client chat client application, or any other executable code or application known in the art for hosting a chat session. When the chat session is displayed in the same browser as the content that contains the selected entity, the user is enabled to immediately view, without changing tabs or applications, a chat session associated with the displayed content. In addition, the user may be able to scroll the browser window while maintaining the display of the chat session.

In one embodiment, the interactive chat session may be displayed as an overlay on top of the transmitted content. In this case, the chat session may completely obscure the content underneath the chat session, or the chat session may be displayed with a level of transparency enabling the user to simultaneously view the transmitted content and the interactive chat session. Alternatively or additionally, the chat session may be embedded into the content by moving or shifting the content in one or more directions to make room for the chat session. Alternatively or additionally, the interactive chat session may be pinned to a set of absolute coordinates in the browser window, allowing the user to scroll or otherwise navigate the transmitted content while maintaining a view of the chat session. By maintaining the chat session in the same browser window as the transmitted content, the user may conveniently navigate and chat without switching which application or browser tab is active, or which application or browser tab has the system focus.

In one embodiment, upon selection of an entity, static content may be presented in conjunction with an interactive chat session, providing additional information to a user that may enhance the interactive chat session. For example, upon selection of an entity and display of an interactive chat session, the web server 351 may initiate a back end query at run time to a data store or picture repository. For example, an online encyclopedia, dictionary, or the like may be employed. Alternatively or additionally, the web server 351 may initiate a back end query at run time for data or pictures associated with the selected chat topic.

In one embodiment, the content may be enabled with a scripting language such as JavaScript, vbscript, or Perl that executes in response to the selection. Alternatively or additionally, compiled executable code such as Java, C#, or C++ may be executed. The client-side script or executable code may query a web service or database to determine a topic associated with the selected entity, without communicating with web server 351. In this case, the client-side script or executable code may communicate with chat session manager 352 to initiate a chat session without communicating with web server 351. In one embodiment, a back-up topic associated with the selected entity during the processing of block 406 may be used to initiate an interactive chat session if no other means of determining a chat topic is available.

Figure 5:
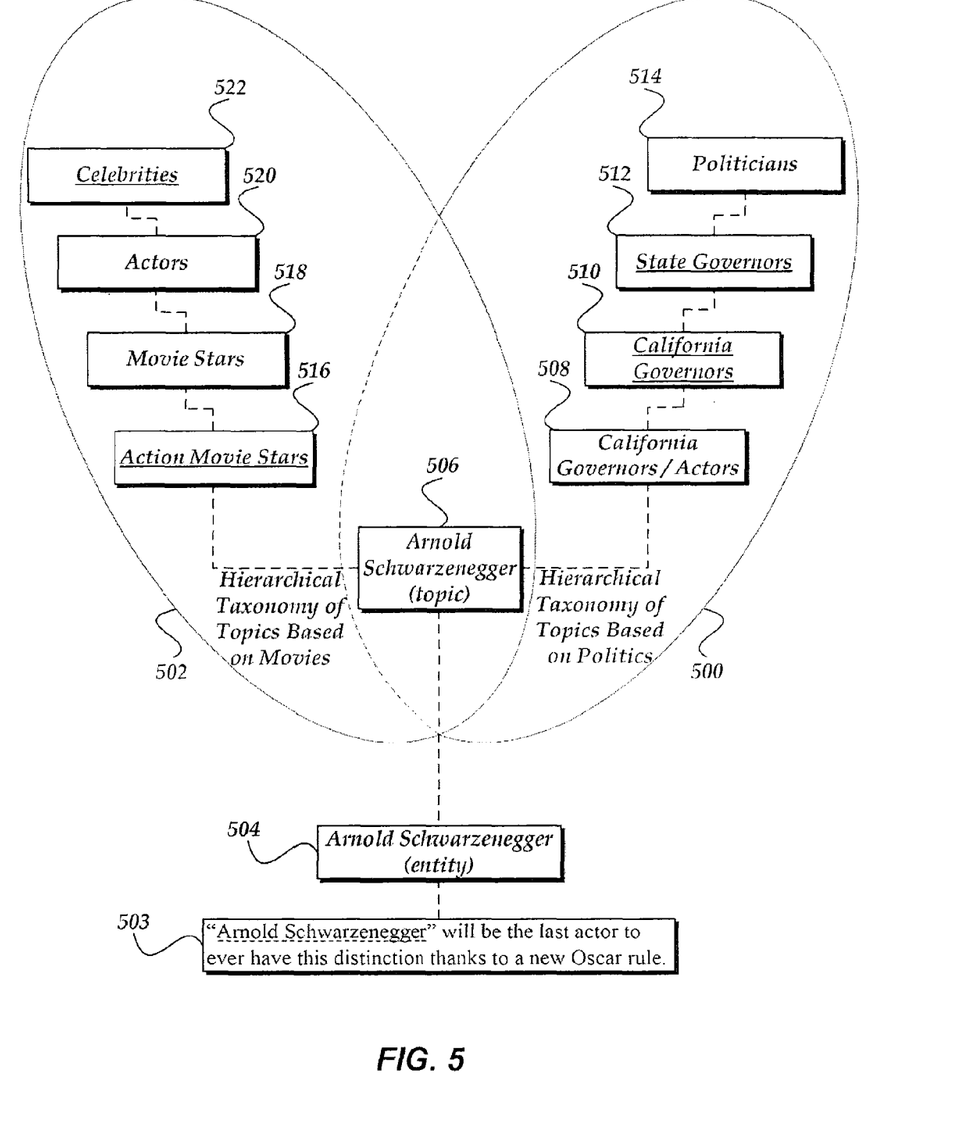
FIG. 5 shows one embodiment of a plurality of hierarchical taxonomies of topics.

FIG. 5 shows an embodiment of a non-limiting, non-exhaustive example of two hierarchical taxonomies of topics. In one embodiment, entity "Arnold Schwarzenegger" 504 is selectable with contextual shortcut 503. Entity 504 may be associated with a single hierarchical taxonomy of topics. For example, entity 504 may be associated with hierarchical taxonomy of topics based on politics 500. Hierarchical taxonomy of topics based on politics 500 may include, for example, topic "California Governors/Actors" 508, topic "California Governors" 510, topic "State Governors" 512, topic "Politicians" 514, and the like.

Alternatively or additionally, entity 504 may be associated with multiple hierarchical taxonomies of topics. For example, entity 504 may additionally be associated with hierarchical taxonomy of topics based on movies 502. Hierarchical taxonomy of topics based on movies 502 may include, for example, topic "Action Movie Stars" 516, topic "Movie Stars" 518, topic "Actors" 520, and topic "Celebrities" 522.

Hierarchical taxonomies of topics may or may not have active chat sessions associated with every topic. In one embodiment, topics for which there is an associated active chat session are indicated by underlining. Other indications include highlighting, bolding, a different font, an associated image, or the like. For instance, topics 510, 512, 516, and 522 are associated with active chat sessions. It is noted however that an active chat session could at some point in time become inactive. In one embodiment, a currently active chat session, for example, one associated with topic 510, might become inactive. Therefore, highlighting from the contextual shortcut might be removed for that topic. Similarly, if a previously inactive chat session for a topic becomes active, highlighting of that topic might be provided In one embodiment, a topic is automatically determined when the topic directly pertains to the selected entity and the topic is associated with an active chat session. For example, topic "Arnold Schwarzenegger" 506 directly pertains to entity 504, and so if an active chat session were associated with topic 506, the user may automatically be presented with this chat session. Alternatively or additionally, topic 506 may be associated with an inactive chat session, or there may be no topic that pertains directly to selected entity 504. In one embodiment, if there is no topic directly pertaining to entity 504 that is associated with an active chat session, then another topic may be selected from a hierarchical taxonomy of topics.

In one embodiment, a topic may be determined by automatically selecting a topic from a plurality of hierarchical taxonomies of topics. A hierarchical taxonomy of topics may be generated based on the selected entity, and a topic for an interactive chat session may be automatically selected by selecting the topic that is closest in proximity to the selected entity. In FIG. 5, for example, topic "Action Movie Stars" 516 would be selected from taxonomies 500 and 502, because topic 516 is only one step removed from entity 504, while topics 510, 512, and 522 are all at least two steps removed from entity 504. If two topics are of an equal number of steps removed from the entity 504, a topic may be chosen based on the level of activity in the associated chat sessions, a user selection, a stored user preference, historical choices made by the user, random chance, or other such methods. In one embodiment, the automatically selected topic is chosen from topics that are associated with active chat sessions. Alternatively or additionally, the automatically selected topic is chosen from topics associated with active and inactive chat sessions.

In one embodiment, a topic may be determined automatically from a taxonomy chosen from a plurality of hierarchical taxonomies of topics. In this embodiment, the user selects a hierarchical taxonomy of topics from a plurality of hierarchical taxonomies of topics. A topic is then automatically chosen from the selected hierarchical taxonomy of topics based on proximity to the selected entity. For example, upon choosing entity 504, a user may be presented with a choice of the hierarchical taxonomy of topics based on politics 500 or the hierarchical taxonomy of topics based on movies 502. If hierarchical taxonomy of topics based on politics 500 is selected, then topic "California Governors" 510 may be automatically selected, as it is the most proximate topic in the selected taxonomy that is associated with an active chat session. If, however, hierarchical taxonomy of topics based on movies 502 is selected, then topic 516 may be automatically selected.

In one embodiment, a topic may be selected manually. A user may be enabled to choose a hierarchical taxonomy of topics, and then select a particular topic from the chosen taxonomy. Alternatively or additionally, the user may be presented with each topic in every taxonomy associated with entity 504, enabling the user to see all of the topics at once before selecting a topic. In one embodiment, only topics associated with active chat sessions are displayed.

Figure 6:
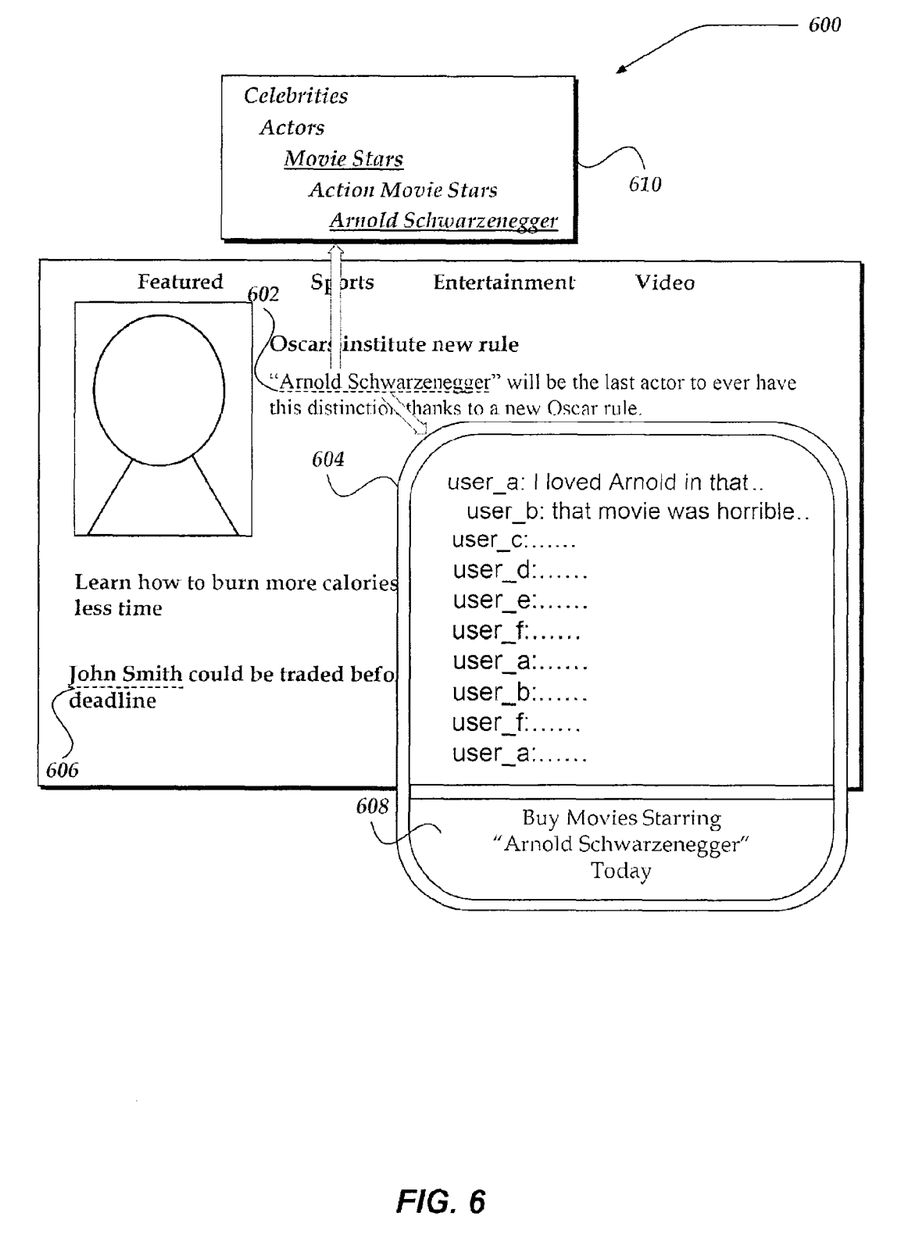
FIG. 6 shows one embodiment of an interactive chat session displayed in response to a user selecting an entity.

FIG. 6 shows an embodiment of a non-limiting, non-exhaustive example of a web page comprising contextual shortcuts and an associated interactive chat session. Contextual shortcut 602 highlights the entity "Arnold Schwarzenegger" with a dotted underline, although other methods of highlighting are similarly contemplated. Contextual shortcut 606 illustrates another entity available to the user for chat. In one embodiment, contextual shortcut 602 may be selected by clicking on it with a mouse pointer. In response, interactive chat session 604 may be displayed within the web page. In one embodiment, interactive chat session 604 is automatically located within the web page that contains contextual shortcut 602, without obscuring at least a portion of the content containing the contextual shortcut. Interactive chat session 604 may include a section for displaying chat text, and a section for receiving chat text from the user. Advertisement pane 608 may include advertisements associated with the selected entity, or alternatively the advertisements may be associated with the topic of the interactive chat session.

In one embodiment, upon selection of contextual shortcut 602, a hierarchical taxonomy of chat topics 610 is displayed, enabling a user to select a desired chat topic. In one embodiment, chat topics associated with active chat rooms may be distinguished from chat topics associated with no active chat sessions by highlighting the chat topic. For example, chat topics associated with active chat rooms may be underlined. Other examples of highlighting chat topics associated with active chat rooms include changing the font, font color, font size, background color, bolding, italics, an image, a bitmap, or any other indication that a chat topic is associated with an active chat room. In another embodiment, only the active topics with active chat sessions are displayed. Once a chat topic is selected, an interactive chat session pertaining to the selected topic is displayed.

In one embodiment, the advertisement pane may be displayed on the side or bottom of interactive chat session 604. In another embodiment, ads may be displayed in other areas of the main web page. For example, ads related to the currently selected target object may be dynamically selected and displayed on panes around the web page. When a user selects an entity, one set of ads may be dynamically displayed and when the user selects a second entity, a different set of ads may be displayed. In another embodiment, interactive chat session 604 may include a control (not shown), such as a button, that when activated keeps interactive chat session 604 open even if other entities are selected and other corresponding interactive chat sessions are opened. In yet another embodiment, interactive chat session 604 may stay open by default until the user closes it by a positive action, such as clicking a Close button or using some other mechanism.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device, comprising:
   a transceiver configured to communicate with a client device over a network; and
   a processor that is operative to perform the following:
   receiving content to be provided to a user of the client device;
   identifying an entity in the content and a topic related to the entity;
   identifying a first interactive chat session associated with the topic;
   modifying the content to generate modified content that incorporates a first representation indicating that there is at least one interactive chat session associated with the entity;
   generating a second representation to be displayed with the topic when the entity is selected, wherein the topic is to be displayed with a third representation indicating that the first interactive chat session associated with the topic is currently available to the user, and wherein the topic is selected from a hierarchical taxonomy of topics that is closest in proximity in the hierarchical taxonomy to the entity; and
   providing the modified content and the second representation to the client device, wherein the first interactive chat session is to be inserted inline into the modified content when the user selects the third representation which indicates that the first interactive chat session associated with the topic is currently available to the user.

2. The network device of claim 1, the processor being further operative to perform the following:
   generating the hierarchical taxonomy of topics based on the entity; and
   selecting the topic for the first interactive chat session.

3. The network device of claim 1, wherein the entity is selectable based on at least one of the user hovering a cursor over the entity being displayed or the user clicking on the entity being displayed.

4. The network device of claim 1, the processor being further operative to perform the following:
   removing the first representation when no chat session associated with the entity is available.

5. The network device of claim 1, wherein the first interactive chat session is to be displayed overlaid on top of the modified content.

6. The network device of claim 1, the processor being further operative to perform the following:
   generating the hierarchical taxonomy of topics for display based on the entity; and
   determining the topic based on a received selection from a display of at least a portion of the hierarchical taxonomy of topics, the portion being displayed including topics having active chat sessions.

7. A system comprising:
   a processor; and
   a memory in communication with the processor storing instructions that when executed by the processor define modules including:
   a first module configured to:
   receive content to be provided to a user,
   identify an entity within the content and a topic related to the entity, and
   identify a first interactive chat session associated with the topic; and
   a second module configured to:
   modify the content to generate modified content that incorporates a first representation indicating that there is at least one interactive chat session associated with the entity,
   generate a second representation to be displayed with the topic when the entity is selected, wherein the topic is to be displayed with a third representation indicating that the first interactive chat session associated with the topic is currently available to the user, and wherein the topic is selected from a hierarchical taxonomy of topics that is closest in proximity in the hierarchical taxonomy to the entity, and
   provide the modified content and the second representation, wherein the first interactive chat session is to be inserted inline into the modified content when the user selects the third representation which indicates that the first interactive chat session associated with the topic is currently available to the user.

8. The system of claim 7, wherein the user is enabled to initiate a chat session based on the entity selected.

9. The system of claim 7, wherein the first representation comprises at least one of a button, an icon, a menu item, a hyperlink, highlighted text, underlined text, or a contextual shortcut.

10. The system of claim 7, wherein a content provider identifies the entity within the content.

11. The system of claim 7, wherein the entity is associated with the plurality of hierarchical taxonomies of topics, wherein the user is enabled to select at least one of the plurality of hierarchical taxonomies of topics.

12. The system of claim 7, wherein the first interactive chat session is such that the modified content is viewable by the user.

13. The system of claim 7, wherein the topic of the first interactive chat session comprises a default topic generated before the modified content is provided.

14. A non-transitory machine readable storage medium having information recorded thereon for managing a chat session, wherein the information, when read by a machine, causes the machine to perform the following:
   receiving content from a content provider, the content provider identifying an entity in the content and a topic related to the entity;
   identifying a first interactive chat session associated with the topic;
   modifying the content to generate modified content that incorporates a first representation indicating that there is at least one interactive chat session associated with the entity;
   generating a second representation to be displayed with the topic when the entity is selected, wherein the topic is to be displayed with a third representation indicating that the first interactive chat session associated with the topic is currently available to the user, and wherein the topic is selected from a hierarchical taxonomy of topics that is closest in proximity in the hierarchical taxonomy to the entity; and
   providing the modified content and the second representation, wherein the first interactive chat session is to be inserted inline into the modified content when the user selects the third representation which indicates that the first interactive chat session associated with the topic is currently available to the user.

15. The medium of claim 14 wherein the information, when read by the machine, further causing the machine to initiate the first interactive chat session based on the topic when no interactive chat session associated with the topic is available.

16. The medium of claim 14, the identifying the first interactive chat session comprises the information, when read by the machine, to causes the machine to further perform the following:
   generating a default chat topic associated with the entity.

17. The medium of claim 14, wherein the first interactive chat session is to be displayed overlaid above the modified content.

18. The network device of claim 1, wherein when the hierarchical taxonomy of topics include two or more topics of an equal number of steps in the hierarchical taxonomy from the entity, the topic is selected based on at least one of: a level of activity in an associated interactive chat session, a user selection, a stored user preference, historical choices made by the user, and a random selection.

19. The network device of claim 1, wherein the first interactive chat session is displayed while display of the modified content is maintained.

20. The network device of claim 1, wherein providing the modified content and the second representation further comprises:
   providing a browser window comprising the modified content, the second representation, and the first interactive chat session, wherein the first interactive chat session is displayed within the browser window as at least the modified content is displayed within the browser window.

* * * * *